March 31, 1959      R. CALVERT      2,880,390

APPARATUS FOR MEASURING SMALL DISTANCES

Filed Dec. 3, 1956      2 Sheets-Sheet 1

March 31, 1959   R. CALVERT   2,880,390
APPARATUS FOR MEASURING SMALL DISTANCES
Filed Dec. 3, 1956   2 Sheets-Sheet 2

INVENTOR
RAYMOND CALVERT
BY
Mawhinney + Mawhinney
ATTORNEYS

2,880,390
APPARATUS FOR MEASURING SMALL DISTANCES

Raymond Calvert, New Malden, England, assignor to The Wayne Kerr Laboratories Limited, New Malden, England, a British company Application December 3, 1956, Serial No. 626,013

13 Claims. (Cl. 324—61)

Micrometers for measuring distances of up to an inch or so can readily be constructed for measuring to one ten-thousandth of an inch. For many purposes, however, it is required to make measurements of smaller magnitudes than this but existing methods of achieving this greater accuracy are generally time-consuming and require costly apparatus. It is an object of the present invention to provide a relatively simple form of apparatus which will enable much finer measurement to be made than is possible with a micrometer.

According to this invention, apparatus for measuring small distances comprises an electrical bridge for comparing two capacities, one of which capacities is formed by a first pair of electrodes which are relatively movable towards and away from one another, calibrated adjusting means being provided for effecting the relative movement of the two electrodes whereby their spacing may be measured, and the other of which capacities is formed by a second pair of electrodes relatively movable towards and away from one another and of effective electrical area which is a known small fraction of that of the first pair of electrodes whereby the spacing of the second pair of electrodes, when the bridge is balanced, is a known fraction of the spacing of the first pair of electrodes. When the bridge is balanced the ratio of the two capacities is known from the bridge. The ratio of these two capacities, however, is directly proportional to the effective areas of the electrodes and is inversely proportional to the spacings of the electrodes. Hence if the ratio of the effective areas is known and the bridge ratio is known, the spacing of the second pair of electrodes is directly proportional in known ratio to that of the first pair of electrodes. In a typical example, a second pair of electrodes may have an effective area which is one-hundredth of that of the first pair. In this case, if the first pair of electrodes is movable by means of a micrometer adjustment capable of adjusting the electrodes over a range of 0–1 inch to an accuracy of one-ten-thousandth of an inch, then the spacing of the second pair of electrodes can be determined over the range 0 to one-hundredth of an inch with a discrimination of one micro-inch.

In order that the two capacities should have constant effective electrical areas it is preferable that the two electrodes forming each of these capacities should comprise a first electrode having a flat plane surface of known surface area surrounded by a guard ring, which first electrode cooperates with an adjacent parallel second electrode of much greater area. The guard ring, which is insulated from the electrode it surrounds, ensures that the electrical field between the two electrodes is straight and at right angles to the surfaces of two electrodes thereby avoiding any errors due to edge effects.

For comparing the two capacities having guard rings as described above, it is desirable to use a bridge circuit having a neutral line and it is, therefore, preferred to use an inductive ratio arm alternating current bridge, the inductive ratio arms being formed by two windings connected in series and arranged on a common core and the two capacities forming the remaining two arms. In such a bridge the voltage ratio of the two arms is constant and the junction point of the two windings provides a neutral point to which the guard rings of the capacities may be connected.

The two ratio arms may conveniently be the secondary windings of an input voltage transformer.

A detector winding may be connected between the junction of the arms containing the two capacities and the junction of the two ratio arms, which detector winding forms a primary winding of an output current transformer. With this bridge the guard rings may be connected to the neutral line (that is the connection between the detector winding and the junction of the ratio arms).

The apparatus described above measures the spacing between the second pair of electrodes. Conveniently one of this pair of electrodes is formed as a probe and for this purpose it is generally desirable to use the smaller electrode. That electrode may be mounted as a probe on the end of a screened cable, the screening being connected to a guard ring.

There are many purposes for which the apparatus described above can be set up and used for the accurate measurement of small distances but one particular application may be mentioned by way of example. In using slip gauges for measuring the internal dimensions of a workpiece, it is found that a slight amount of wear occurs in the gauges. It is, therefore, the practice, if very accurate dimensioning is required, to have a master gauge and periodically to compare the gauges in use with the master. This can be done by using the apparatus described above employing the two gauges to be compared in turn as the second electrode of the aforementioned second condenser. The probe, comprising an electrode and guard ring, is mounted at an appropriate height on an adjustable support and is connected to the bridge by a length of concentric cable. The master gauge is put underneath the probe and the height of the probe adjusted so that it is a convenient distance from the surface of the master gauge. This master gauge is connected as the second electrode to the bridge and the spacing between the probe and the master gauge is measured by adjusting the micrometer adjustment controlling the spacing of the electrodes of the other capacity until the bridge is balanced. The master gauge is then replaced by the gauge under test and the bridge is then re-balanced by re-adjusting the spacing of the electrodes of said first capacity. The difference in the dimensions of the two gauges is directly proportional to the change in the micrometer setting and, if the effective areas of the two capacities are in ratio of one hundred to one and the micrometer can be read to one ten-thousandth of an inch, the difference in dimensions between the two gauges can be read directly in micro-inches. As another example of the application of the apparatus of the present invention the probe might be used to measure differences in the dimensions of a workpiece in a lathe or milling machine by clamping the probe to the tool post.

As another example, one of the electrodes of said first capacitor may be mounted on a bellows so that the relative spacing of the two electrodes may be adjusted by varying fluid pressure applied to the bellows. This arrangement is of particular advantage in controlling machine tools and similar apparatus in which fluid pressure, for example air or oil pressure, is used to move the part requiring adjustment. In such apparatus, a fluid-operated servo-mechanism may be provided for controlling the part requiring adjustment.

According to a further feature of the invention, means may be provided for switchably connecting one or more fixed capacitors in series with said first capacity. The fixed capacities which may be switched in series are equivalent, when the bridge is balanced to fixed increments of distance between the electrodes of the second capacity. Thus the possible range of measurements can be increased by known increments. In a typical case, the first capacity may be made adjustable over a range equivalent to one thousandth of an inch relative movement of the electrodes of the second capacity, and the fixed capacitors which may be switched into circuit in this case may conveniently be made equivalent to further steps of one thousandth of an inch in the spacing between the electrodes of the second capacity. Thus a distance is measured in thousandths of an inch by counting the number of fixed capacitors inserted into circuits and noting the additional fractional part of a thousandth represented by the setting of the first capacity. With this arrangement only a very small range of adjustment is required for the first capacity since additional range of measurement is effected by the switch capacitors. Because of this, it may be convenient in some cases to make one of the electrodes of the first capacity movable in response to the out-of-balance indication of the bridge so that the first capacity is automatically altered in response to any out-of-balance indication so as to tend to balance the bridge. For example, the first capacity may be adjustable by having a movable vane which is mechanically coupled to a moving coil or other type of out-of-balance indicator for the bridge circuit. Thus, when the bridge is out-of-balance, the out-of-balance indicator will move the vane to rebalance the bridge. The moving vane or the indicator may be calibrated as required. This arrangement has a further advantage in that it facilitates the provision of a remote reading of the indications since the switching of the capacitors may be effected from a remote point and the fine reading represented by the position of the moving vane is determined by an electric current, the magnitude of which can readily be indicated at the remote point.

In the following description, reference will be made to the accompanying drawings in which.

Figure 1:
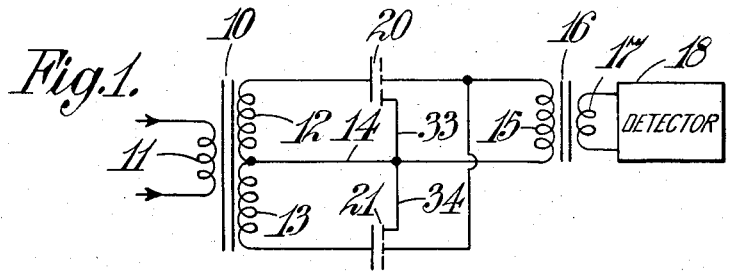
Figure 1 is a circuit diagram illustrating one embodiment of the invention.

Referring to Figure 1 there is shown an inductive ratio arm alternating current bridge having an input voltage transformer 10 with an input winding 11 adapted to be energised from a source of alternating current and having two output windings 12, 13 which are connected in series and wound on a common core. The junction point of the two windings 12, 13 is connected by a line 14 (referred to hereinafter as the neutral line) to one end of a winding 15 on an output current transformer 16. This transformer 16 has an output winding 17 which is coupled to a detector 18. The end of the winding 12 remote from the neutral line is connected to one plate of a capacitor 20, the other plate of which is connected to the end of the winding 15 remote from the neutral line. Similarly the end of the winding 13 remote from the neutral line is connected to one plate of a capacitor 21, the other plate of which is connected also to the end of the winding 15 remote from the neutral line.

It will be seen that with the bridge circuit shown in Figure 1, there will be no current through the winding 15 if the currents through the two capacitors 20, 21 are equal, that is to say if the capacities of these two capacitors are in the ratio of the voltages developed across the windings 12, 13.

Assuming that the capacity of the capacitor 20 is to be measured, then the balance of the bridge can be obtained by adjusting the capacity of the capacitor 21 and for the purpose of the present invention, this adjustment is effected by altering the spacing between the plates of the capacitor. As is well known, the capacity of a parallel plate condenser, assuming the condenser is free from edge effects, is proportional to the effective area of the plates and is inversely proportional to their spacing. In practice, the windings 12, 13 are conveniently made to have an equal number of turns so that equal voltages are applied to the two capacitors. The effective plate area of the adjustable standard capacitor 21 is made a multiple of, in a typical case a hundred times, the effective area of the plates of the capacitor 20. Using these figures, the bridge will be balanced when the spacing between the plates of the capacitor 20 is one-hundredth of the spacing between the plates of the capacitor 21. Thus if the spacing between the plates of the capacitor 21 is adjusted by means of a micrometer that has a range of zero to one inch and can be set to one ten-thousandth of an inch, then the setting of this micrometer enables the distance between the plates of the capacitor 20 to be measured within the range of zero to one-hundredth of an inch with the discrimination of one micro-inch.

Figure 2:
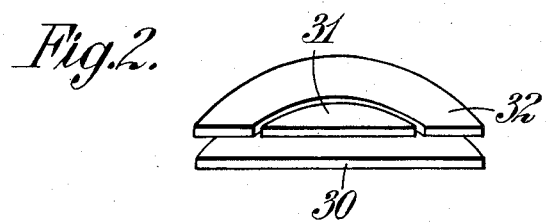
Figure 2 is a perspective view of a capacitor, having circular plates, which has been sectioned across a diameter.

In order to avoid edge effects on the capacitor, these may be arranged in the manner shown in Figure 2, having one large plate 30 co-operating with a smaller plate 31, which latter plate is surrounded by a guard ring 32. The guard ring 32 is arranged so that the spacing of the plate 30 from the plate 31 is kept the same as the spacing of the plate 30 from the guard ring 32. The guard rings of each capacitor are connected to the neutral line of the bridge as indicated by the connections 33, 34 on Figure 1. The effective area of this guard ring capacitor would be the area of the smaller plate 31.

Figure 5:
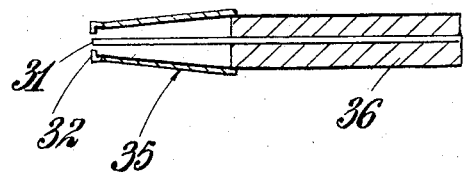
Figures 5 and 6 illustrate parts of the apparatus in further detail.
Figure 6:
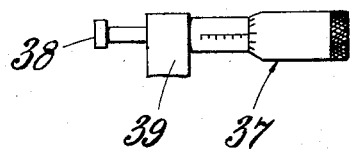

The arrangement thus far described serves to measure the spacing of the plates of capacitor 20. In applying the arrangement to a particular problem, one plate of the capacitor, generally the larger plate, would usually be formed by a surface of the article to be measured or by a surface of a movable element which is brought into contact with the article to be measured. The plate 31 and guard ring 32 may conveniently be constructed in the form of a probe 35 (Figure 5) which can be mounted on a vertical column of a height gauge and which can be connected to the bridge by means of a length of concentric cable 36. In this case, if the height gauge is to be used for measuring the dimensions of a slip gauge by comparison with a master gauge, the top surfaces of the master and slip gauges may be used to form the plate 30 of the condenser. The probe would be set to a convenient distance above the surface of a master gauge and then rigidly clamped on the column in this position. The master gauge would then be replaced by the slip gauge to be measured and the bridge balanced by means of the micrometer adjustment on the condenser 21. Figure 6 illustrates a micrometer adjusting device 37 for adjusting the position of a plate 38 of a capacitor with respect to a fixed structure member 39. The movement of the micrometer required to re-balance the bridge is directly proportional to the difference in dimensions between the master gauge and the gauge under test, the proportionality factor being known from the turns ratio of the windings 12, 13 and the relative effective areas of the two capacitors 20, 21.

Figure 3:
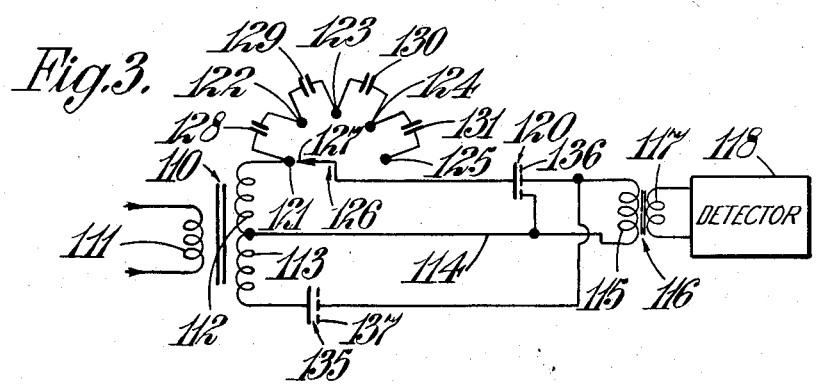
Figures 3 and 4 are circuit diagrams illustrating two further embodiments of the invention.

Referring to Figure 3, there is shown an inductive ratio arm alternating current bridge having an input voltage transformer 110 with an input winding 111 adapted to be energised from a source of alternating current and having two output windings 112, 113 which are connected in series and wound on a common core. The junction point of the two windings 112, 113 is connected by a line 114 (referred to hereinafter as the neutral line) to one end of a winding 115 on an output current transformer 116. This transformer has an output winding 117 which is coupled to a detector 118. The end of the winding 112 remote from the neutral line is connected to a terminal 121 forming one of a number of fixed terminals 121–125 of a rotary switch 126 having a movable switch arm 127 which can be set on to any one of the terminals 121 to 125. This switch arm 127 is connected to one plate of a capacitor 120, the other plate of which is connected to the end of the winding 115 remote from the neutral line 114. Connected between adjacent pairs of the terminals 121 to 125 are capacitors 128 to 131 so that one or more of the capacitors 128 to 131 may be connected in series with the capacitor 120.

The end of the winding 113 remote from the neutral line 114 is connected to one plate of a capacitor 135 and the other plate of this capacitor is connected to the end of the winding 115 remote from the neutral line.

It will be seen that, with the bridge circuit shown in Figure 3, there is no current through the winding 115 if the currents through the two capacitors 120, 135 are equal, that is to say if the capacity of capacitor 135 bears a ratio to the effective capacity of capacitor 120 together with any of the capacitors 128 to 131 which may be connected in circuit with it are in the ratio of the voltages developed across the windings 112, 113.

The capacitor 135 is formed by the capacity to be measured and has an effective plate area which is a fraction of the effective area of the plates of the capacitor 120. In a typical case, the effective plate area of capacitor 135 is one hundredth of that of the capacitor 120, and, assuming this figure, if the rotary switch arm 127 is set on the terminal 121, the bridge will be balanced when the spacing between the plates of the capacitor 120 is one hundred times as great as the spacing of the plates of the capacitor 135. Thus, with the switch in this position, the distance between the plates of the capacitor 135 can be determined by adjusting the spacing between the plates of the capacitor 120 until the bridge is balanced, this spacing then being one hundred times the required value. The adjustment of the plates of capacitor 120 is effected by means of a micrometer which can be set to one thousandth of an inch and thus the distance between the plates of capacitor 135 can be measured with a discrimination of one hundred-thousandth of an inch. The switch 122 enables one or more fixed capacitors to be connected in series with the capacitor 120 and these are equivalent, when the bridge is balanced, to steps of distance between the electrodes of the capacitor 135. Thus for example, if the micrometer adjustment of capacitor 120 has a range of one inch (equivalent to one hundredth of an inch in the spacing between the plates of the capacitor 135), the capacitors 128 to 131 may conveniently be made equivalent to further steps of one hundredth of an inch in the spacing of the plates of capacitor 135.

The two electrodes of the capacitors 120 and 135 may comprise a first electrode having a flat plane surface of known surface area surrounded by a guard ring, which first electrode co-operates with a parallel second electrode of much greater area.

As shown in Figure 3, the two guard rings 136, 137 are connected to the neutral line 114 so as to eliminate fringing flux at the edges of the smaller electrodes and also to make it possible to eliminate any necessity for compensating for the capacity of the connections from the bridge to the electrodes.

Figure 4:
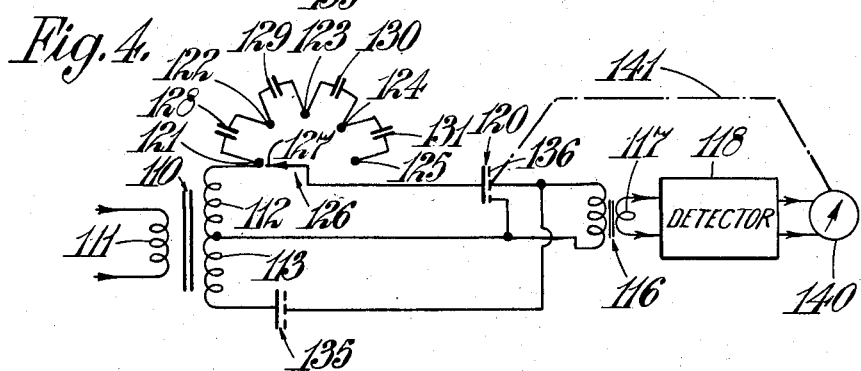

Figure 4 illustrates a modification of the arrangement of Figure 3. The same reference characters are used for similar components and, in the following description, mention will be made only of the features which distinguish the arrangement of Figure 4 from that of Figure 3. In Figure 4, the output of the detector 118 is applied to a moving coil indicator 140 and the moving coil of this indicator is coupled mechanically, as indicated by the chain-dotted line 141, to the movable plate of the capacitor 120, which, in this arrangement is not set by a micrometer but is a freely movable vane controlled by the moving coil indicator 140. The indicator 140 is arranged to move the vane in a direction so as to tend to balance the bridge and thus the arrangement forms a self balancing bridge in which the spacing between the plates of capacitor 120 may be determined from the reading of the indicator 140. The fixed capacitors 128 to 131 are arranged, in this case, to provide relatively small incremental steps and thus there is no problem in calibrating the indicator 140 to the required degree of accuracy in the measurement of the spacing of the plates of capacitor 135.

Since the fine reading in the system of Figure 4 is represented by an electric current, it can readily be indicated at a remote point, from which the switch 126 may also be controlled, so that the required distance measurement may be made at a location remote from the workpiece or other article being measured.

I claim:

1. Apparatus for measuring small distances comprising an electrical bridge for comparing two capacities, one of which capacities is formed by a first pair of electrodes which are relatively movable towards and away from one another, calibrated adjusting means being provided for effecting the relative movement of the two electrodes whereby their spacing may be measured, and the other of which capacities is formed by a second pair of electrodes relatively movable towards and away from one another and of effective electrical area which is a known small fraction of that of the first pair of electrodes whereby the spacing of the second pair of electrodes, when the bridge is balanced, is a known fraction of the spacing of the first pair of electrodes.

2. Apparatus as claimed in claim 1 wherein said calibrated adjusting means comprises a micrometer adjustment.

3. Apparatus as claimed in claim 1 wherein the two electrodes in each pair comprise a first electrode having a flat plane surface of known surface area surrounded by a guard ring, which first electrode co-operates with a parallel second electrode of much greater area.

4. Apparatus as claimed in claim 3 wherein the electrical bridge comprises an inductive-ratio-arm alternating-current bridge, the inductive-ratio-arms being formed by two windings connected in series and arranged on a common core and two capacities forming the remaining two arms, said second electrodes being connected to the ends of said windings remote from their junction and wherein the guard rings of the two capacities are connected to the junction point of the two windings.

5. Apparatus as claimed in claim 4 wherein the two ratio arms are the secondary windings of an input voltage transformer.

6. Apparatus as claimed in claim 4 wherein the bridge includes a detector winding connected between the junction of the arms containing the two capacities and the junction of the two ratio arms, which detector winding forms the primary winding of an output current transformer.

7. Apparatus as claimed in claim 1 wherein one of said second pair of electrodes is formed as a probe which has an end surface of area small compared with the co-operating surface area of the other electrode of this pair.

8. Apparatus as claimed in claim 7 wherein the probe is arranged on the end of an inner conductor of a screened cable, the screening being connected to a guard ring around the probe.

9. Apparatus for measuring small distances comprising an electrical bridge for comparing two capacities, one of which capacities is formed by a first pair of electrodes which are relatively movable towards and away from one another and a plurality of fixed capacitors with switch means for switchably connecting one or more of said fixed capacitors in series with said first pair of electrodes, calibrated adjusting means for effecting relative movement of the two electrodes of said first pair whereby their spacing may be measured, and the other of which capacities is formed by a second pair of electrodes relatively movable towards and away from one another and of effective electrical area which is a known fraction of that of the first pair of electrodes.

10. Apparatus as claimed in claim 9 wherein the two electrodes in each pair comprise a first electrode having a flat plane surface of known surface area surrounded by a guard ring, which first electrode cooperates with a parallel second electrode of much greater area.

11. Apparatus as claimed in claim 10 wherein said bridge comprises an inductive ratio arm bridge, the inductive ratio arms being formed by two windings connected in series and arranged on a common core and wherein the guard rings of the two capacities are connected to the junction point of the two windings.

12. Apparatus as claimed in claim 9 wherein one of the electrodes of said first capacity is movable in response to the out-of-balance indication of the bridge so that the first capacity is automatically altered in response to any out-of-balance indication so as to tend to balance the bridge.

13. Apparatus for measuring small distances comprising an inductive ratio arm alternating current bridge for comparing two capacities, the inductive ratio arms being formed by two windings connected in series and arranged on a common core, one of the capacities being formed by a first pair of electrodes which are relatively movable towards and away from another, calibrated micrometer adjusting means being provided for effecting the relative movement of the two electrodes whereby their spacing may be measured, and the other of which capacities is formed by a second pair of electrodes relatively movable towards and away from each other and of effective electrical area which is a known small fraction of that of the first pair of electrodes, said bridge further comprising a signal detector for detecting any signal between the two terminals of the detector input, means connecting one of the detector input terminals directly to the junction of said windings forming the ratio arms, means connecting the ends of said windings remote from their junction respectively to first electrodes of each of said capacities, means connecting the second electrodes of each of said capacities to the second of the detector input terminals, guard electrodes surrounding said second electrodes of each of said capacities, and means connecting said guard electrodes to said one of the detector input terminals, said first electrode in each of said capacities having a much greater area than the associated second electrode.

References Cited in the file of this patent

UNITED STATES PATENTS

| | | |
|---|---|---|
| 2,241,190 | Fenning | May 6, 1941 |
| 2,285,152 | Firestone | June 2, 1942 |
| 2,510,822 | Jacot et al. | June 6, 1950 |
| 2,588,702 | Cornelius | Mar. 11, 1952 |
| 2,656,507 | Fielden | Oct. 20, 1953 |
| 2,718,620 | Howe | Sept. 20, 1955 |
| 2,721,975 | Wojciechowski | Nov. 28, 1955 |
| 2,802,178 | Shafer et al. | Aug. 6, 1957 |
| 2,830,114 | Carlson | Apr. 8, 1958 |

FOREIGN PATENTS

| | | |
|---|---|---|
| 762,396 | Britain | Nov. 28, 1956 |